Jan. 6, 1970  E. H. SCHUSTACK  3,487,534
METHOD OF ASSEMBLING PIPE COUPLINGS
Filed Feb. 20, 1967
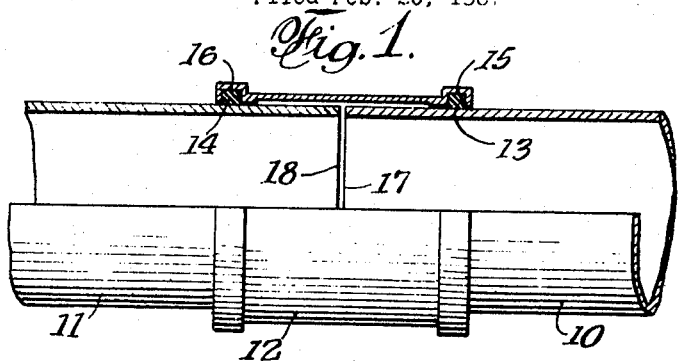
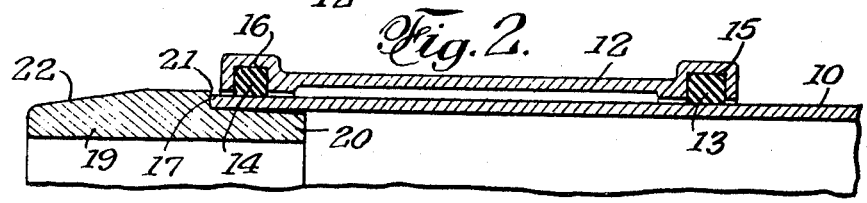
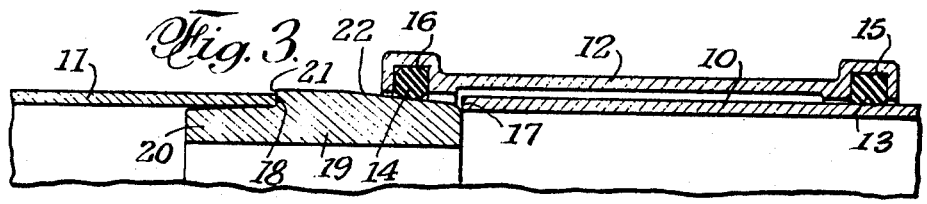
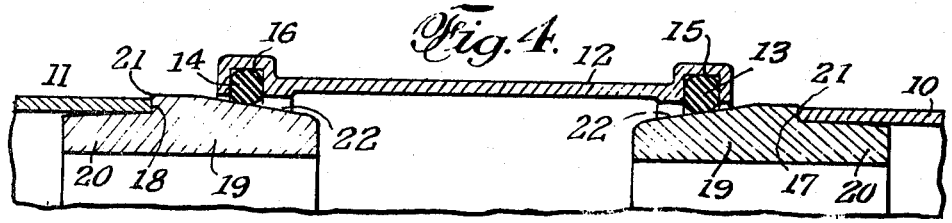
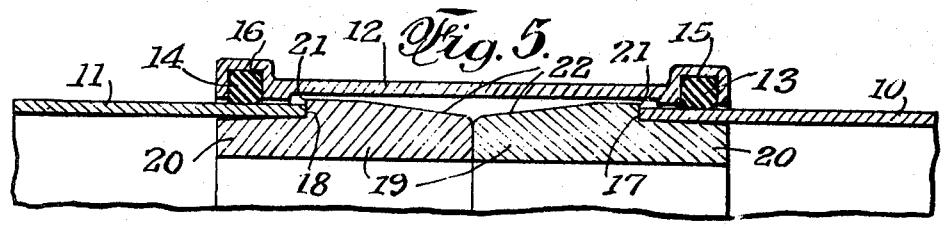
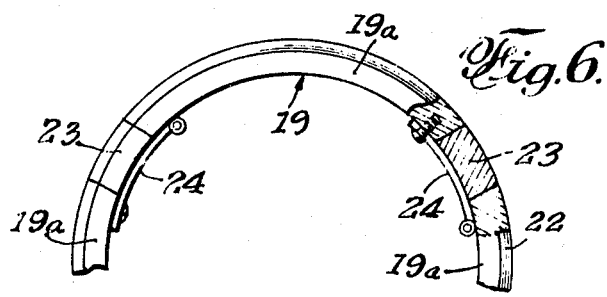
INVENTOR.
EDWARD H. SCHUSTACK
BY C. G. Stratton
ATTORNEY United States Patent Office 3,487,534
Patented Jan. 6, 1970

3,487,534
METHOD OF ASSEMBLING PIPE COUPLINGS
Edward H. Schustack, 1816 N. Stanley,
Los Angeles, Calif. 90046
Filed Feb. 20, 1967, Ser. No. 617,153
Int. Cl. B23p 11/02
U.S. Cl. 29—450                                2 Claims

ABSTRACT OF THE DISCLOSURE

This invention deals with an improved method for coupling plain-end pipes of large size and relatively thin walls, frequently considerably out-of-round. The out-of-round characteristic is materially emphasized when such pipes are horizontally disposed upon a support surface or other supports. The present method facilitates connection of said pipes by a coupling which effects a liquid-tight seal with the ends of the pipes that are so coupled, by retaining the pipes being connected in such form that their connection is facilitated.

BACKGROUND OF THE INVENTION

Applicant's United States Letters Patent No. 3,168,779, it is believed, represent the most pertinent prior art. This patent has basis on a coupling assembly method in which a tapered extension is removably fitted on the end of one of the pipes and serves to guide a coupling sleeve onto said one pipe so that two longitudinally spaced sealing rings in grooves at the opposite ends of said sleeve are expanded by the taper of said extension and are compressed into their respective grooves, the sealing rings being held in compression by the outer face of the pipe. The extension is then removed and the end of the other pipe is butted against the end of the pipe having the sleeve thereon. Finally, the sleeve is slid along the first pipe onto the other pipe until the abutting ends of the pipes reside within the sleeve with each pipe being in sealing engagement with one of said sealing rings. The method of said patent is efficient provided the pipes being coupled are truly round, which is the exception rather than the rule. In such case, the sliding of the coupling sleeve is readily effected without damage to the sealing ring, whose position is transferred from the first pipe to the second pipe. In the event that said second pipe is out-of-round, the bulging portions thereof may damage the gasket, impairing the seal and rendering the coupling inoperable. In some instances, the out-of-round pipe will shear off a substantial part or parts of the ring, completely nullifying the efficiency of said ring to seal between the pipe and the coupling. The present invention, therefore, has for an object to provide a method in which both pipes are retained in similar form whether truly or approximately round, so the sealing ring slid thereon is retained in uncut and otherwise undamaged condition, insuring an efficient seal between the pipes and the connecting coupling.

The citations in applicant's above patent are: McWane, 2,146,641, Feb. 7, 1936; Rembert, 2,329,000, Sept. 7, 1943; Heisler, 2,738,992, Mar. 20, 1956; Magnani, 2,914,347, Nov. 24, 1959; Kazienko, 3,120,967, Feb. 11, 1964.

It will be noted that none of these prior art patents includes the steps of maintaining similarity of the cross-sectional forms of the two pipes being coupled during application of the coupling sleeve, particularly those pipes that are square-ended and are thin-walled. These patents do not suggest a cure for the damage to the seals caused by being cut and/or abraded by the edges of the ends of out-of-round pipes. Applicant's own patent maintains one of the pipes in its proper form, but not the other. The second pipe often cuts into the gasket into which it is introduced, due to its being of different form than the first pipe. The lack of the step of retaining comparability of shape has, in the past, greatly increased the time cost of effecting coupling of such pipes.

This invention also has for its objects to provide a novel, economical and convenient method or process of superior utility.

The invention also comprises novel combinations of method steps, which will appear more fully in the course of the following description, the same being based on the accompanying drawing. However, the following specification merely discloses preferred embodiments of the present invention, and the same are given by way of example only.

DESCRIPTION OF THE INVENTION

In the drawing, like reference characters designate similar parts in the several views.

FIG. 1 is a side elevational view, in quarter-section, showing a coupling assembled on and connecting two pipe ends by a method according to this invention.

FIG. 2 is an enlarged and fragmentary longitudinal sectional view showing an intermediate step of one embodiment of the present invention.

FIG. 3 is a similar view of a subsequent intermediate step.

FIG. 4 is a view, similar to FIG. 3, showing an early step of a modified method.

FIG. 5 is a similar view showing the final step of said modified method.

FIG. 6, to a reduced scale, shows a fragmentary side view, partly in section, of a tapered nose used in the present assembly method.

It is the purpose of the present invention to connect the adjacent ends of two pipes 10 and 11 by a coupling sleeve 12 in which compressed sealing rings 13 and 14 are retained in the opposite ends of said sleeve and have hydraulic sealing contact with the outer faces of the respective pipes 10 and 11. As indicated in the drawing, the rings 13 and 14 when in such contact are so compressed, from an initially round sectional form, as to conform, in part, to the shape of the grooves 15 and 16 and, in part, to the cylindrical outer surfaces of the respective pipes. In practice, the rings 13 and 14, when relaxed, have an outer diameter substantially coinciding with the diameter of the groove bottoms, and an inner diameter substantially smaller than the outer diameter of the pipes. The sizes of the sealing rings and the grooves in which they reside are so proportioned that, upon expansion of the rings to compress them against the groove bottoms, the flattened inner portion of each ring will have a diameter to conform, by hydraulic fit, to the surface that expands it. As shown, the respective ends 17 and 18 of the pipes are square-ended.

FIGS. 1, 2 and 3 illustrate a method of utilizing a single tapered nose 19 that is in the form of a ring of metal or other inelastic material, having a reduced end 20 that has a sliding and shape-retaining fit into either pipe 10 or 11, an annular shoulder 21 abutting the pipe ends 17 or 18, and a tapered end 22 at the end opposite to the reduced end 20. As shown, the outer diametral size of said nose 19 is preferably slightly greater than the outer diameter of the pipes 10 and 11. The slope of the taper on the nose end 22 is preferably gradual.

The nose 19 may be solid, but is preferably made in any suitable manner to be collapsible. FIG. 6, for instance, shows the nose as having removable sections 23 that are held in place by means 24, the same, when removed inwardly, releasing the sections 19a of the nose so they may be withdrawn inwardly.

With the nose 19 fitted to the end of pipe 10, as in FIG. 2, the sleeve 12 may be slid onto said pipe by first sliding the ring 13 over the tapered end 22 of the nose to cause the ring to be expanded and, as above explained, to be compressed into its groove 15 so as to form an hydraulic seal with the outer surface of the pipe. The sleeve is slid further until the ring 14 is similarly engaged with said pipe surface. FIG. 2 shows the completion of this first method step.

Now, as shown in FIG. 3, the nose 19, after removal from the pipe 10, is fitted in the same way into the end of pipe 11. Upon removal of the nose 19, the pipe 10 is retained by the sleeve 12 in the round or approximately round form, due to the hydraulic sealing contact of the rings 13 and 14 compressed into the grooves 15 and 16. Thus, this step of the method provides for the end of pipe 10 first being brought into seal-receiving shape by the nose, and then being retained in such shape by the sleeve 12. The tapered end 22 of the nose 19, after being fitted into the end of pipe 11, is abutted against the end 17 of the pipe 10, as in FIG. 3, and deforms the pipe 11 so its rounded shape conforms to the shape of pipe 10, as retained by the sleeve 12. Now it is a simple matter, without damage to the ring 14, to slide the sleeve 12 so the ring 14, guided by the taper of the nose, will achieve the same engagement with the pipe 11 as the ring 13 has with the pipe 10. Finally, the nose 19 is collapsed inwardly and the sections thereof removed from the end of either pipe. The pipes are now coupled as in FIG. 1. In temporary connections, the nose 19 may remain in place; of course, this may also be the case in permanent connections. However, a removable nose is a re-usable tool and, therefore, reduces the cost of connecting pipe joints.

FIGS. 1, 4 and 5 illustrate a modified method, using two tapered noses 19, one in the end of each pipe. As shown in FIG. 4, the two noses are placed with the tapered ends thereof directed toward each other, the opposite ends of the sleeve being engaged over said tapered ends with the rings 13 and 14 riding up the shallow slopes of the noses. When the noses are brought into abutment, as in FIG. 5, the rings 13 and 14 slide off the noses into hydraulic engagement with the respective pipes 10 and 11. The coupling is now completed, except for the removal of the noses 19, as before, and bringing the pipe ends 17 and 18 into either abutment or close adjacency.

While the foregoing discloses what are now contemplated to be the best modes of carrying out the invention, the same are, of course, subject to modification without deparing from the spirit and scope of the invention. Therefore, it is not desired to restrict the invention to the particular method steps or combination or sequence of mehod steps described, but to cover all equivalent steps or methods that may fall within the scope of the appended claims.

Having thus described the invention, what is claimed and desired to be secured by Letters Patent is:

1. The method of assembling a coupling sleeve over the adjacent ends of two square-ended, thin-walled pipes, the sleeve being provided with two sealing rings at the opposite ends thereof and disposed in inwardly open and longitudinally spaced annular grooves, and adapted to hydraulically seal around the respective pipes, said method consisting in:

fitting the end of one of said pipes with a substantially inelastic member having a tapered portion that extends from said pipe end, sliding the mentioned sleeve over said tapered portion of said member to first cause said portion to compress one of said sealing rings, continuing to slide said sleeve to move said ring into hydraulic contact with said pipe end, and, finally, similarly compressing the other of said sealing rings by continued sliding movement of the sleeve to move said other ring, also, into hydraulic engagement with said pipe end, removing said member from said one pipe, fitting the same onto the end of the other of said pipes, and placing the tapered portion thereof into substantially abutting relationship to and in axial alignment with the first pipe, and finally, sliding the sleeve in the direction opposite to its first direction of movement to move the second-mentioned sealing ring off the first pipe, over the tapered portion of the mentioned member, and into hydraulic engagement with said second pipe while the first-mentioned sealing ring retains hydraulic engagement with the first pipe.

2. The method as defined in claim 1 in which the member having the tapered portion is formed as a sectional ring, and is removable inwardly from between and in engagement with either of said pipes.

References Cited

UNITED STATES PATENTS

| 2,738,992 | 3/1956 | Heisler | 285—349 X |
| 3,168,779 | 2/1965 | Schustack | 29—450 |
| 3,282,610 | 11/1966 | White | 29—451 X |

CHARLIE T. MOON, Primary Examiner

U.S. Cl. X.R.

29—235, 237; 285—18, 369